United States Patent
Moser et al.

(10) Patent No.: US 9,809,689 B2
(45) Date of Patent: Nov. 7, 2017

(54) FIBRE REINFORCED COMPOSITE MOULDING

(75) Inventors: Johannes Moser, Pasching (AT); Uwe Karner, Pasching (AT); Pascal Perrillat-Collomb, Saint-Victor-de-Morestel (FR)

(73) Assignee: Hexcel Holding GMBH, Pasching (AT)

( * ) Notice: Subject to any disclaimer, the term of this patent is extended or adjusted under 35 U.S.C. 154(b) by 1002 days.

(21) Appl. No.: 14/117,078

(22) PCT Filed: May 17, 2012

(86) PCT No.: PCT/EP2012/059227
§ 371 (c)(1),
(2), (4) Date: Oct. 14, 2014

(87) PCT Pub. No.: WO2012/159977
PCT Pub. Date: Nov. 29, 2012

(65) Prior Publication Data
US 2015/0031818 A1    Jan. 29, 2015

(30) Foreign Application Priority Data

May 20, 2011   (AT) .................................. A 734/2011

(51) Int. Cl.
C08J 5/04        (2006.01)
B29C 35/02       (2006.01)
B29C 70/54       (2006.01)
C08J 5/06        (2006.01)

(52) U.S. Cl.
CPC ................. *C08J 5/04* (2013.01); *B29C 35/02* (2013.01); *B29C 70/54* (2013.01); *C08J 5/06* (2013.01); *C08J 2300/00* (2013.01)

(58) Field of Classification Search
CPC .......................................................... C08J 5/04
USPC ........................................................... 524/500
See application file for complete search history.

(56) References Cited

U.S. PATENT DOCUMENTS 4,252,513 A * 2/1981 Kalnins ................... B29C 35/02
                                                                    264/450
2006/0292375 A1   12/2006 Martin

FOREIGN PATENT DOCUMENTS

| DE | 10354106 | 6/2005 |
| DE | 102006023865 | 11/2007 |
| EP | 2206599 | 7/2010 |
| WO | 2010/083840 | 7/2010 |

\* cited by examiner

*Primary Examiner* — Terressa Boykin
(74) *Attorney, Agent, or Firm* — W. Mark Bielawski; David J. Oldenkamp

(57) ABSTRACT

A method of producing molded articles. The method uses a fibrous material and a first and second resin material. The first resin material is at least partially cured before being combined with the fibrous material and the second resin material. The molding material is inserted into a mold and processed to form a molded article by providing energy. The molded article is produced using less energy than would be necessary for processing a molding material which did not include a partially cured first resin material.

13 Claims, 3 Drawing Sheets

FIBRE REINFORCED COMPOSITE MOULDING

Figure 1:
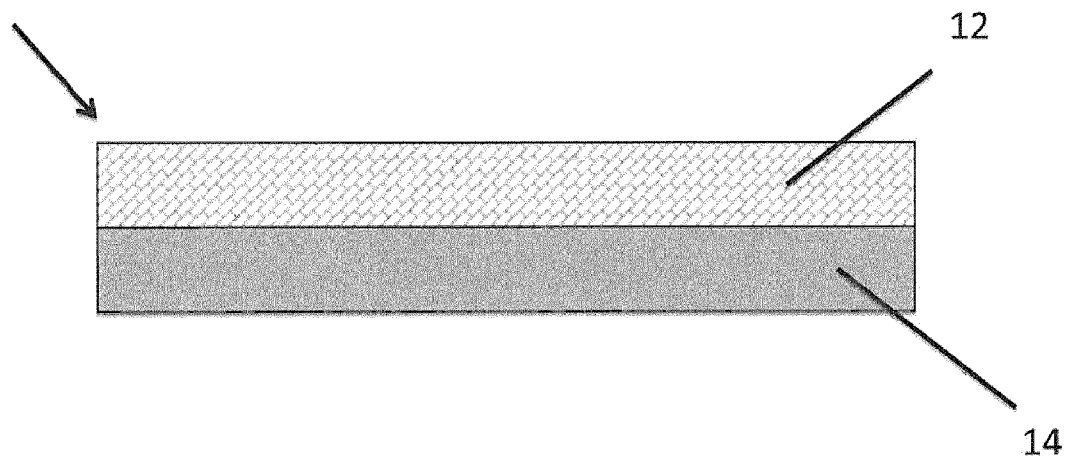

The present invention relates to a moulding material, particularly but not exclusively to a preform moulding material, a process for the production of a moulding material, a method of moulding and an article moulded from the aforesaid moulding material.

INTRODUCTION

Composite moulding materials generally comprise a reinforcement material which is commonly a fibrous material and a resin material. The moulding materials may comprise a fibrous reinforcement material which may be impregnated with a resin (prepreg). The moulding materials are laid up in one or more layers in a mould to form a composite structure moulding which is subsequently cured to form a product or an article. The resin material may be a thermosetting plastic, also known as a thermoset. A thermoset is a polymer material that irreversibly cures.

The material can usually cure at ambient temperatures ranging typically from −20° C. to 30° C., but the time for the material to proceed to full cure at these temperatures is long, typically ranging from an hour to several days or even weeks or months. This is undesirable for the commercial manufacture of composite moulded products. Therefore, the cure reactions are enhanced to decrease the moulding time by increasing the energy of the material through heating (generally above 40° C.), or irradiation such as electron beam processing.

The curing reaction is an exotherm reaction. To control the reaction, the energy input is typically staged into two or more stages to prevent a runaway exotherm reaction in the moulding which would result in poor mechanical properties of the moulded article. If the energy input is in the form of heating to increase the temperature of the moulding, then typically in the first stage of processing, the temperature is increased over time to a desired first level and held constant for a time period (known as the dwell stage or dwell period). Following on from the first dwell period, the temperature is further increased to a second level and held constant over time (second dwell stage). The temperature increase and subsequent dwell may be further repeated depending on the properties of the moulding.

Conventional processing thus takes a long time to process a moulding. This renders the production of composite mouldings containing thermoset resins less suitable to manufacture on a large commercial scale.

In addition, the processing of mouldings is generally complicated and requires a lot of expertise and equipment to control the energy input or temperature of the moulding during curing. Often, in addition to heating and temperature control equipment, the moulding is also pressurized to ensure adequate wetting out of the reinforcement material by the resin material.

The present invention aims to obviate or at least mitigate the above described problems and/or to provide improvements generally.

SUMMARY OF THE INVENTION

According to the invention, there is provided a method, a moulding, a moulding material and a moulded article as defined in any one of the accompanying claims.

In an embodiment of the invention, there is provided a method of manufacturing a moulded article comprising the steps of providing a moulding material comprising a fibrous reinforcement material, a first resin material and a second resin material, the first resin material being at least partially processed; providing the moulding material in relation to a mould to form a moulding; and processing the moulding to form the moulded article by providing energy input to the moulding. The energy input for processing the moulding to form the moulded article is less than the energy input required for processing the moulded article from a moulding comprising the same first and second resin material whereby the first resin material is in unprocessed form.

This results in a reduced energy input for processing the moulding, which in turn enables faster processing. Also, as part of the processing is conducted during the manufacture of the moulding material, processing of the moulding is simplified and more efficient. This reduces moulding costs and also in turn reduces the time for producing moulded articles.

In a preferred embodiment, the moulding is processed by heating to a dwell temperature and by maintaining the moulding at a dwell temperature. The moulding is processed by heating to a cure temperature and maintaining the moulding at a dwell temperature in a dwell stage, the dwell stage being shorter than the dwell stage required for manufacturing the moulded article from a moulding comprising the same first and second resin material in which the first resin material is unprocessed. In-mould processing may comprise a dwell temperature which is higher than the dwell temperature required for manufacturing the moulded article from a moulding comprising the same first and second resin material in which the first resin material is unprocessed.

According to another aspect of the invention, there is provided a method of manufacturing a moulding material comprising providing a fibrous reinforcement material, a first resin material and a second resin material, the respective resin materials being in contact with said fibrous reinforcement material, and; at least partially processing the first resin material.

The first resin material is partially processed to part cure the material or it is completely processed to a cured material before locating the moulding material in relation to a mould. This in turn reduces the energy input for processing the moulding material when the material is processed in a mould to form a moulded article, and decreases the overall time for processing the moulding to cure.

According to a further aspect of the invention, there is provided a fibrous reinforcement material, a first resin material and a second resin material, the respective resin materials being in contact with said fibrous reinforcement material, the first resin material being at least partially processed.

In a preferred embodiment, the fibrous reinforcement material is impregnated with the respective resin materials and the first and second resin material comprise the same resin. The fibrous reinforcement material may comprise a first layer comprising the first resin material and a second layer comprising the second resin material.

The first and second layer may preferably be combined to form the moulding material. In a preferred embodiment, the first layer is completely cured and combined with an uncured second layer to form the moulding material.

In another embodiment, the moulding material may comprise a fibrous layer comprising a partially cured or fully cured first resin material and an uncured or partially uncured second resin material.

The energy input for processing the moulding to form the moulded article is less than the required energy input for processing the moulded article from a moulding material comprising the same first and second resin material in which the first resin material is unprocessed.

In another embodiment, the moulding material is adapted for processing in a single temperature dwell stage.

In a further embodiment of the invention, the dwell stage during processing is shorter than the dwell stage required for manufacturing the moulded article from a moulding comprising the same first and second resin material in which the first resin material is unprocessed. The material may have a dwell temperature which is higher than the dwell temperature required for manufacturing the moulded article from a moulding comprising the same first and second resin material in which the first resin material is unprocessed.

In another embodiment of the invention, the moulding material is shaped or oriented before its application in the mould. This provides conformance of the material to the mould surface.

DETAILED DESCRIPTION

As discussed previously, moulding materials comprise a reinforcement material and a resin material. The moulding material is cured to form a moulded article. The curing process transforms the resin from a plastic substance by a cross-linking process. Energy and/or catalysts are added that cause the molecular chains to react at chemically active sites linking into a rigid, 3-D structure. The cross-linking process forms a molecule with a larger molecular weight, resulting in a material with a higher melting point. During the reaction, the molecular weight increases to a point so that the melting point is higher than the surrounding ambient temperature, and the material forms into a solid material. Uncontrolled reheating of the material results in reaching the decomposition temperature before the melting point is obtained. Therefore, a thermoset material cannot be melted and re-shaped after it is cured. The moulding material may form a moulding assembly of one or more moulding materials.

In a moulding or assembly which comprises one or more prepreg layers, the exothermic release of energy during curing can be significant, especially in the centre/middle of the moulding. This can result in overheating of the moulding which can be problematic if the mould cannot be exposed to high temperatures. Using one or more layers of cured material could significantly reduce the exothermic energy release.

The energy input by heating is typically staged into a constant temperature first curing stage or first dwell stage followed by a constant temperature second curing stage or second dwell stage and subsequent stages whereby the temperature in the second or subsequent stages is either higher or lower than the preceding stage. This renders curing of the composite material a time consuming process which makes the process less suitable to high volume manufacturing of large moulded parts.

In an aspect of the invention, there is provided a method of manufacturing a moulded article comprising the steps of providing a moulding material comprising a fibrous reinforcement material, a first resin material and a second resin material, the first resin material being at least partially processed; providing the moulding material in relation to a mould to form a moulding; and processing the moulding to form the moulded article by providing energy input to the moulding.

The energy input for processing the moulding to form the moulded article is less than the energy input required for processing the moulded article from a moulding comprising the same first and second resin material. The present invention enables single stage heat curing which improves the processing speed and efficiency of the moulding. This is largely achieved because the moulding has a reduced release of exotherm energy or exotherm heat during curing as the moulding includes cured or part cured prepreg layers prior to curing.

In an embodiment the moulding material may comprise a fibrous layer comprising a partially cured first resin material, wherein the extent of partial cure of the first resin material results in a decrease in tack compared to the second resin material. The tack of the first resin material may be lower than the tack of the second resin material. The tack of the resin material may be determined by the slope and ball test. The slope and ball test is conducted by mounting a layer of resin of 1 mm thickness on a plane surface. The surface is inclined at an angle of 45 degrees. A steel ball of a weight of 50 g is located and the surface and the time for the ball to travel over a distance of 50 cm is measured. This time is a measure for the tack of the resin.

The epoxy resin used in the preparation of the prepreg preferably has an Epoxy Equivalent Weight (EEW) in the range from 150 to 1500 preferably a high reactivity such as an EEW in the range of from 200 to 500 and the resin composition comprises the resin and an accelerator or curing agent. Suitable epoxy resins may comprise blends of two or more epoxy resins selected from monofunctional, difunctional, trifunctional and/or tetrafunctional epoxy resins.

Suitable difunctional epoxy resins, by way of example, include those based on: diglycidyl ether of bisphenol F, diglycidyl ether of bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be selected from diglycidyl ether of bisphenol F, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), and Araldite ECN 1299 (from Huntsman Advanced Materials).

The epoxy resin composition preferably also comprises one or more urea based curing agents and it is preferred to use from 0.5 to 10 wt % based on the weight of the epoxy resin of a curing agent, more preferably 1 to 8 wt %, more preferably 2 to 8 wt %. Preferred urea based materials are the range of materials available under the commercial name Urone®. In addition to a curing agent, a suitable accelerator such as a latent amine-based curing agent, such as dicyanopolyamide (DICY).

The complex viscosity of a resin can be obtained using a rheometer to apply an oscillation to the resin. From this the complex modulus G* is derived if the complex oscillation which is applied to the material is known (Principles of Polymerization, John Wiley & Sons, New York, 1981).

In viscoelastic materials the stress and strain will be out of phase by an angle delta. The individual contributions making the complex viscosity are defined as G'(Storage Modulus)=G*x cos (delta); G"(Loss Modulus)=G*x sin (delta). This relationship is shown in FIG. 8 of WO 2009/118536.

G' relates to how elastic the material is and defines its stiffness. G" relates to how viscous a material is and defines the damping, and liquid non recoverable flow response of the material.

For a purely elastic solid (glassy or rubbery), G"=0 and the phase angle delta is 0°, and for a purely viscous liquid, G'=0 and the phase angle delta is 90°.

The viscoelastic properties, i.e. the storage modulus, loss modulus and complex viscosity, of the resin used in the moulding material of the present invention can be measured by using a TA Instruments AR2000 rheometer with disposable 25 mm diameter aluminium plates, carried out with the following settings: an oscillation test at decreasing temperature reducing from 40° C. down to −10° C. at 2° C./mm with a controlled displacement of $1\times10^{-4}$ rads at a frequency of 1 Hz and a gap of 1000 micrometer.

The loss modulus G" indicates the irreversible flow behaviour and a material with a high loss modulus G" is also desirable to prevent the early creep-like flow of the resin. Therefore the resin used in the moulding material of the present invention has a high storage modulus and a high loss modulus, and correspondingly a high complex modulus, at a temperature corresponding to a typical lay-up temperature, such as room temperature (20° C.).

The resin material preferably has a phase angle delta such that the value of delta increases by at least 25° C. over a temperature range of from 10 to 25° C. Optionally, the value of the phase angle delta increases by a value of from 25 to 70° C. over a temperature range of from 10 to 25° C. Optionally, the value of the phase angle delta between the complex modulus G* and the storage modulus G' increases by a value of from 35 to 65° C. over a temperature range of from 10 to 25° C. Optionally, the value of the phase angle delta is no more than 70° and/or at least 50° at at least a value of within the temperature range of from 12.5 to 25° C.

In an embodiment at least a surface of a partially cured first resin material may have a phase angle between the complex modulus G* and the storage modulus G', wherein the value of the phase angle δ undergoes a reduction of at least 1°, or 4°, or 5°, or 10°, 15°, 20°, 30°, 40°, or 50°, 60°, 70°, or 80° and/or combinations of any one of the aforesaid values compared to an uncured second material.

As explained in further detail below, an uncured resin has a high phase angle i.e. towards 90°, because uncured resins behave as viscous liquids and can exhibit some tack (or surface adhesion).

Partially cured resins have a lower phase angle than an uncured resin, because they behave more like an elastic solid, and will have a lower tack than an uncured resin.

In this specification, the viscoelastic properties, i.e. the storage modulus, loss modulus and complex viscosity, of the resin used in the prepregs of the present invention were* measured at application temperature (i.e. a lay-up temperature of 20 C) by using a TA Instruments AR2000 rheometer with disposable 25 mm diameter aluminium plates. The measurements were carried out with the following settings: an oscillation test at decreasing temperature reducing from 40° C. down to −10° C. at 2° C./mm with a controlled displacement of $1\times10^{-4}$ rads at a frequency of 1 Hz and a gap of 1000 micrometer.

In an embodiment the moulding material may comprise a fibrous layer comprising a partially cured first resin material, wherein the extent of partial cure of the first resin material can be defined by the energy input required from an uncured state to a partial cure δE, where δE is expressed as a percentage of the total energy input required for full cure ΔE. In an embodiment the moulding material may comprise a fibrous layer comprising a partially cured first resin material, wherein the δE is at least 1%, or 2%, or 5%, or 10%, or 20%, or 30% or 40% or 50% of ΔE, and/or any ranges formed from the aforesaid percentage values.

Accordingly, the present invention provides a moulding material in which the resin material has a storage modulus G' of from $3\times10^5$ Pa to $1\times10^8$ Pa and a loss modulus G" of from $2\times10^6$ Pa to $1\times10^8$ Pa. Preferably, the resin material has a storage modulus G' of from $1\times10^6$ Pa to $1\times10^7$ Pa, more preferably from $2\times10^6$ Pa to $4\times10^6$ Pa. Preferably, the resin material has a loss modulus G" of from $5\times10^6$ Pa to $1\times10^7$ Pa, more preferably from $7\times10^6$ Pa to $9\times10^6$ Pa. Preferably, the resin material has a complex viscosity of from $5\times10^5$ Pa to $1\times10^7$ Pa·s, more preferably from $7.5\times10^5$ Pa to $5\times10^6$ Pa·s. Preferably, the resin material has a complex viscosity of from $1\times10^6$ Pa to $2\times10^6$ Pa·s, more preferably from 5 to 30 Pa·s at 80° C. Preferably, the resin material has a viscosity of from 10 to 25 Pa·s at 80° C. Preferably, the resin material is an epoxy resin.

We have discovered that the aforesaid storage modulus and loss modulus properties allow the first and/or second resin materials to remain in place during handling, storage and lay up of the moulding material to the start of processing when the laminate stack formed from the moulding material or assembly of multiple moulding material layers is heated up to temperatures over 40° C. and a vacuum pressure are applied, even if multiple plies (stacks of 20, 30, 40, 60 or even more plies) are laid up.

The behaviour of the first and/or second resin material may be highly viscoelastic at the typical lay-up temperatures used. The elastic solid portion stores deformation energy as recoverable elastic potential, whereas a viscous liquid flows irreversibly under the action of external forces.

Typically, the stiffness of the viscoelastic resin is characterised by the resin exhibiting a high elastic rheological response. The resin rheology is characterised by a storage modulus G' of the resin, preferably between $3\times10^5$ Pa and $1\times10^8$ Pa at 20° C., more preferably from $1\times10^6$ Pa to $1\times10^7$ Pa, yet more preferably from $2\times10^6$ Pa to $4\times10^6$ Pa.

In the manufacture of a structural member in the form of a spar or beam using the moulding material or structure of the present invention, preferably the resin has a high loss modulus G" between $2\times10^6$ Pa and $1\times10^8$ Pa at 20° C., more preferably from $5\times10^6$ Pa to $1\times10^7$ Pa, yet more preferably from $7\times10^6$ Pa to $9\times10^6$ Pa.

The resin material preferably has a high complex viscosity at 20° C. of from $5\times10^5$ Pa to $1\times10^7$ Pa·s, more preferably from $7.5\times10^5$ Pa to $5\times10^6$ Pa·s, yet more preferably from $1\times10^6$ Pa to $2\times10^6$ Pa·s.

Furthermore, as stated above, the viscosity of the first or second resin in the moulding material prior to cure is relatively high. This results in the resin exhibiting low or even negligible flow properties prior to the curing stage which typically occurs at temperatures over 80° C. The resin material preferably has a viscosity of from 5 to 30 Pa·s at 80° C., more preferably from 10 to 25 Pa·s at 80° C. V. The resin flow viscosity during the cure cycle (so typically temperatures over 80° C.) was measured using a TA Instruments AR2000 rheometer with disposable 25 mm diameter aluminium plates. The measurement was carried out with the following settings: increasing temperature from 30 to 130° C. 2° C./mm with a shear stress of 3.259 Pa, gap: 1000 micrometer.

The moulding material may be manufactured in different ways. In an embodiment, a fibrous material impregnated with resin (resin preimpregnated fibrous material or "prepreg") may be part processed or processed through to cure. This material may be combined with another layer of prepreg to form the moulding material. In a preferred embodiment, the moulding material may comprise one or more layers of prepreg and/or partially processed prepreg.

In an alternative embodiment, the moulding material is manufactured from a prepreg precursor which is partially processed or completely processed with respect to a part or area of the prepreg surface. In this way, a moulding material is produced which comprises both processed and unprocessed resin material.

In a preferred embodiment, during processing or partially processing of the resin material, the fibrous reinforcement material is stressed or put under tension to ensure a linear arrangement of the fibres in the fibrous reinforcement material. This greatly enhances the mechanical properties of the moulded article once the moulding containing the moulding material is processed and cured.

The use of the moulding material with one or more fibrous reinforcement layers of unidirectional fabric improves fibre alignment. Mal-aligned fibres are a significant problem in laminates of unidirectional fabrics over 600 gsm. The use of the moulding material in such laminates improves mechanical performance and inter-laminar shear strength. Surprisingly the inter-laminar shear strength of a laminate is not adversely affected with the inclusion of part or fully cured moulding material. Improvements of mechanical performance in such a laminate offset any possible decrease of inter-laminar adhesion.

The moulding material may be provided on a roll and supplied to manufacturers of moulded products or articles. Preferably, following assembly of the moulding material on a roll, the material is cooled or chilled to preserve the activity of the resin and to extend the outlife of the moulding during transport and storage.

Typically, the moulding material is provided with one or more fibrous reinforcement layers. The fibrous reinforcement layers may be impregnated with resin, partially impregnated or even dry. The separate fibrous reinforcement layers can be made of the same or different materials.

The moulding material may be combined with one or more fibrous reinforcement layers to form a laminate, wherein the different reinforcement layers of the laminate may be impregnated with a first and/or second resin and may be fully, partially or uncured.

The moulding material may comprise multiple layers of a fibrous reinforcement material. Each layer may comprise a first resin material or a second resin material and/or a combination of the aforesaid resin materials. The fibrous reinforcement material may comprise a unidirectional fibrous reinforcement material, or a woven fibrous reinforcement material, or a non-woven fibrous reinforcement material and/or combinations thereof.

In a further embodiment, the moulding material may comprise fibrous tows. The fibrous tows may form a unidirectional reinforcement or a woven fibrous reinforcement or a non woven fibrous reinforcement. The moulding material may comprise multiple layers. The layers may comprise unidirectional tows, the tows of each layer being substantially parallel. The two layers may be conjoined by compression so that the unidirectional tows are all in the same plane or substantially in the same plane. One or more additional fibrous layers may also be combined with the conjoined layers.

The reinforcing fibers may be synthetic or natural fibers or any other form of material or combination of materials that, combined with the resin composition of the invention, forms a composite product. The reinforcement web can either be provided via spools of fiber that are unwound or from a roll of textile. Exemplary fibers include glass, carbon, graphite, boron, ceramic and aramid. Preferred fibers are carbon and glass fibers. Hybrid or mixed fiber systems may also be envisaged. The use of cracked (i.e. stretch-broken) or selectively discontinuous fibers may be advantageous to facilitate lay-up of the product according to the invention and improve its capability of being shaped. Although a unidirectional fiber alignment is preferable, other forms may also be used. Typical textile forms include simple textile fabrics, knit fabrics, twill fabrics and satin weaves. It is also possible to envisage using non-woven or non-crimped fiber layers. The surface mass of fibers within the fibrous reinforcement is generally 80-4000 g/m², preferably 100-2500 g/m², and especially preferably 150-2000 g/m². The number of carbon filaments per tow can vary from 3000 to 320,000, again preferably from 6,000 to 160,000 and most preferably from 12,000 to 48,000. For fiberglass reinforcements, fibers of 600-2400 tex are particularly adapted.

Exemplary layers of unidirectional fibrous tows are made from HexTow® carbon fibres, which are available from Hexcel Corporation. Suitable HexTow® carbon fibres for use in making unidirectional fibre tows include: IM7 carbon fibres, which are available as tows that contain 6,000 or 12,000 filaments and weight 0.223 g/m and 0.446 g/m respectively; IM8-IM10 carbon fibres, which are available as tows that contain 12,000 filaments and weigh from 0.446 g/m to 0.324 g/m; and AS7 carbon fibres, which are available in tows that contain 12,000 filaments and weigh 0.800 g/m, tows containing up to 80,000 or 50,000 (50K) filaments may be used such as those containing about 25,000 filaments available from Toray and those containing about 50,000 filaments available from Zoltek. The tows typically have a width of from 3 to 7 mm and are fed for impregnation on equipment employing combs to hold the tows and keep them parallel and unidirectional.

The first and the second resin material may be the same or they may have different properties. The first resin may for example have a higher viscosity than the second resin material at ambient temperature. This enables processing of moulded products which have a low void fraction as the lower viscosity second resin promotes resin impregnation of the moulding. If dry fibrous layers are present, then the resin impregnates these layers during processing.

The moulding material of the invention may be oriented or shaped to the mould. This ensures close conformance to the mould surface. Preferably the moulding material is adapted for use in complex geometries.

The resin materials may be selected from the group consisting of thermoset resins such as epoxy, cyanate ester and phenolic resins. Suitable epoxy resins include diglycidyl ethers of bisphenol A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof. Also included are modified blends of the aforementioned thermosetting polymers. These polymers are typically modified by rubber or thermoplastic addition. Any suitable catalyst may be used. The catalyst will be selected to correspond to the resin used. One suitable catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, bis-urea of toluenediisocyanate and other substituted homologues. The epoxy curing agent may be selected from Dapsone (DDS), Diaminodiphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts.

The resin materials may comprise a toughening agent. Suitable toughening agents can be selected from liquid rubber (such as acrylate rubbers, or carboxyl-terminated acrylonitrile rubber), solid rubber (such as solid nitrite rubber, or core-shell rubbers), thermoplastics (such as poly (EtherSulphone), poly (Imide)), block copolymers (such as styrene-butadiene-methacrylate triblocks), or blends thereof.

The first and the second resin material may be different or the same. The first resin material may be a thermoplastic resin and the second resin material may be a thermoset resin material.

The fibrous reinforcement material may comprise any fibrous material such as glass fibre, aramid, PAN or carbon fibre. As discussed, the fibrous reinforcement material may also comprise multiple layers of fibrous material. Preferably, the fibrous reinforcement layers comprise oriented fibres.

The fibrous material layer may comprise a weight ranging from 100 to 10000 gsm, preferably from 200 to 8000 gsm and more preferably from 200 to 4000 gsm. The thickness of the fibrous layer may range from 0.1 mm to 10 mm, preferably from 0.2 mm to 8 mm.

The fibrous material may be unidirectional, woven, chopped, biaxial or triaxial.

Typical cure cycles for the moulding material include an increase in temperature from ambient to temperatures up to 30 to 160 degrees C., preferably 30 to 140 degrees C., followed by a dwell stage at a fixed temperature ranging from 30 to 200 degrees C., preferably 50 to 140 degrees C., more preferably 50 to 90 degrees C. for a period of time ranging from 5 mins to 10 hours, preferably 10 mins to 5 hours, 10 mins to 4 hours, 30 mins to 2 hours. Following the dwell stage, the temperature is further increased to temperatures up to 60 to 200 degrees C., preferably 60 to 140 degrees C., followed by a cure stage at a fixed temperature ranging from 60 to 200 degrees C., preferably 50 to 140 degrees C., more preferably 50 to 90 degrees C. for a period of time ranging from 5 mins to 10 hours, preferably 10 mins to 5 hours, 10 mins to 4 hours, 30 mins to 3 hours, 30 mins to 2.5 hours.

Figure 2:
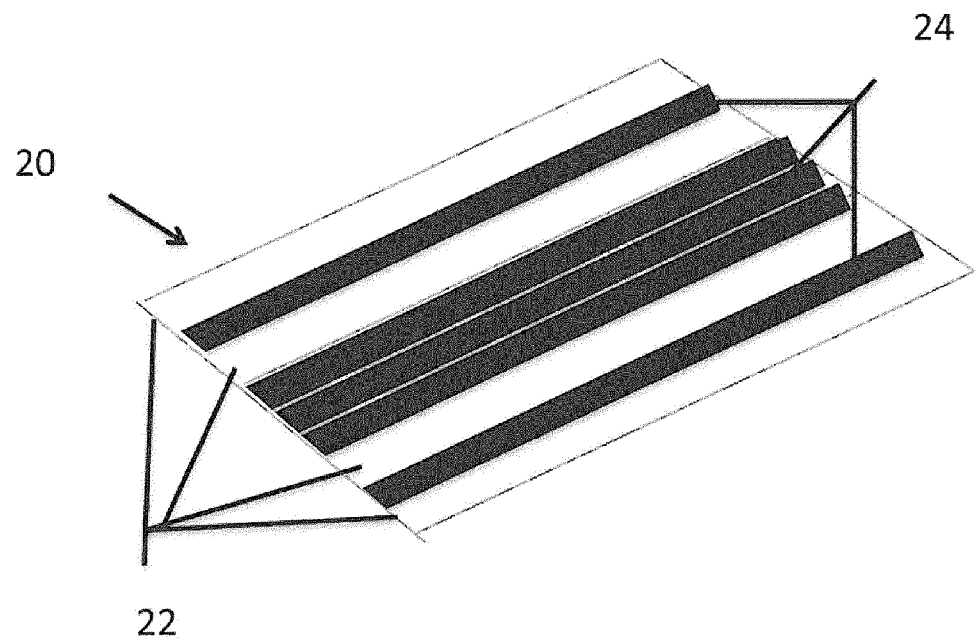
Figure 3:
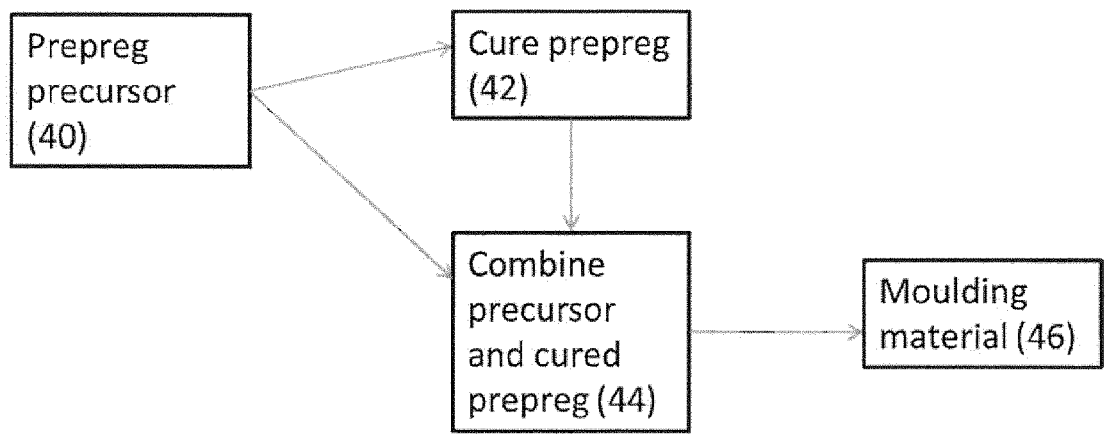
Figure 4:
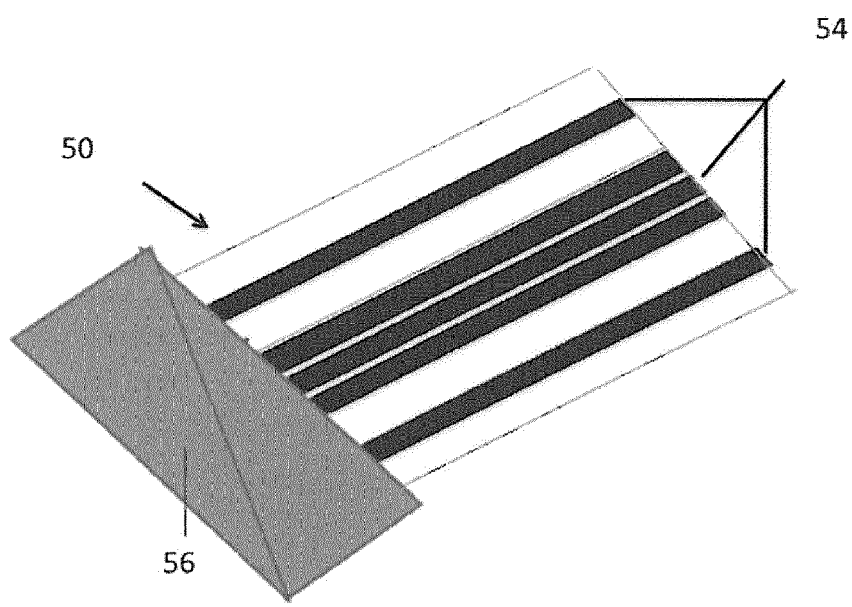
Figure 5:
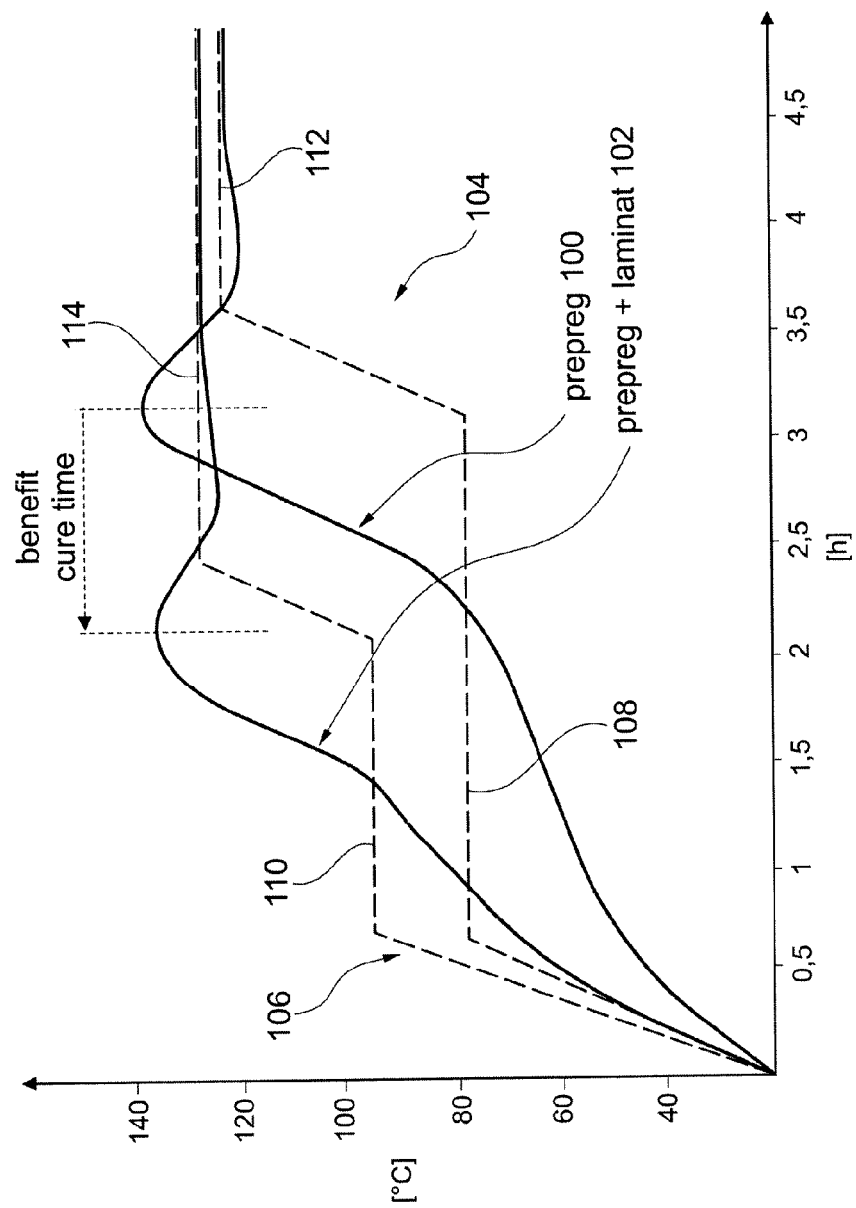

The invention will now be clarified by way of example only and with reference to the accompanying drawings in which FIG. 1 present a diagrammatic view of a moulding according to an embodiment of the invention;

FIG. 2 presents a diagrammatic view of a moulding according to another embodiment of the invention;

FIG. 3 presents a diagrammatic view of a process for producing the moulding material according to a further embodiment of the invention;

FIG. 4 presents a diagrammatic view of another process for producing the moulding material according to a further embodiment of the invention, and FIG. 5 presents a comparison between a conventional moulding cure and a moulding cure according to the invention.

FIG. 1 shows a moulding material 10 comprising a first fibrous layer 14 impregnated with a first resin which has been cured by processing and a further fibrous layer 12 impregnated with a second resin which has not been processed.

FIG. 2 shows an alternative moulding material 20 comprising a fibrous layer which is impregnated with a first resin material 24 and a second resin material 22. The first resin material is partially cured by processing, whereas the second resin material 22 is uncured.

The moulding materials 10,20 can be assembly on a roll by winding and may be laid up in a mould as a single layer or in multiple layers or in combination with other moulding materials to form a moulding. Once laid up, the moulding is processed by curing the moulding to produce a moulded article.

FIG. 3 shows the schematic process for manufacturing the moulding material of the invention. The process comprises multiple steps. First a preimpregnated fibrous material is provided as a prepreg precursor 40. A section of this material is cured 42 to form a cured prepreg, preferably whilst the reinforcement material is under tension. Another section of the material remains unprocessed. The cured prepreg and the unprocessed prepreg are then combined in step 44 to form a moulding material 46.

In use, one or more layers of the moulding materials 10,20 are applied to a mould surface to form a moulding. The moulding materials may also be combined with other additional moulding materials.

The moulding is subsequently processed using a suitable cure schedule which includes a temperature increase to a cure temperature, and a single dwell stage for a period of time at or above the cure temperature during which the moulding reacts to full cure. The dwell stage is followed by cooling of the moulding and its release from the mould as a moulded article.

FIG. 4 shows a particular process for manufacturing the moulding material. In this process 50 a cure station 56 across one or more locations on the surface of the prepreg precursor locally cures the resin. This results in a prepreg comprising processed or cured sections 54 and uncured or unprocessed sections in which the resin is still curable following processing of the moulding material in an in mould lay-up.

FIG. 5 shows a cure of a moulding assembly comprising multiple prepreg layers (50 layers) 100 and the same prepreg (25 layers) in combination with its cured counterpart (25 layers) which are interleaved with the uncured prepreg.

The conventional prepreg assembly 100 is cured by increasing the temperature to a dwell temperature of 80 degrees C. During the dwell period 108, the stack releases its exothermic energy as is evidenced by the increase in assembly temperature with a peak of 140 degrees C. after 3.5 hours. The temperature is then increased to the cure temperature 112 of 120 degrees C. and the assembly is then cured.

The assembly of the invention 102 is cured by increasing the temperature to a higher dwell temperature of approx. 100 degrees C. During the dwell period 110, the stack releases a reduced amount of exothermic energy and this energy is released much sooner after 2.2 hours as is evidenced by the increase in assembly temperature with a peak of 135 degrees C. The temperature is then increased to the cure temperature 112 of 123 degrees C. and the assembly is then cured.

As is evident from this Figure, the cure of an assembly comprising the moulding material of the invention is much quicker and the heat input or energy input which is required to process and cure the material is also reduced.

There is thus provided a moulding material and a method of manufacturing the moulding material which has a reduced exothermic release of heat or energy during the in-mould processing of the material. During the manufacture of the moulding material part of the processing has already taken place which would occur during in-mould processing. This results in a simpler cure schedule, improved performance and quality of the moulded article, greater processing speeds and a reduction of the energy input for in-mould processing of the moulding to form a moulded article.

The invention claimed is:

1. A method of manufacturing a molded article comprising:
   a) providing a molding material comprising a fibrous reinforcement material, a first resin material and a second resin material, the first resin material being at least partially processed; followed by
   b) providing the molding material into a mold to form a molding; and
   c) processing the molding in said mold to form the molded article by providing energy input to the molding, the energy input for processing the molding to form the molded article being less than the energy input required for manufacturing the molded article from a molding comprising the same volume of said first and second resin material in which the first resin material is not at least partially processed.

2. A method of manufacturing a molded article according to claim 1 wherein said in-mold processing comprises
   heating said molding to a cure temperature and maintaining the molding at a dwell temperature in a dwell stage, the dwell stage being shorter than the dwell stage required for manufacturing the molded article from a molding comprising the same first and second resin material in which the first resin material is unprocessed.

3. The method of claim 1, wherein the molding is processed by heating to a cure temperature and maintaining the molding at a dwell temperature in a dwell stage, the dwell stage being shorter than the dwell stage required for manufacturing the molded article from a molding comprising the same first and second resin material in which the first resin material is unprocessed.

4. The method of claim 2, wherein in-mold processing comprises a dwell temperature which is higher than the dwell temperature required for manufacturing the molded article from a molding comprising the same first and second resin material in which the first resin material is unprocessed.

5. The method of claim 1, wherein the partially processed first resin material is fully cured.

6. A method of manufacturing a molding material comprising:
   a) providing a fibrous reinforcement material, a first resin material and a second resin material, the first and second resin materials being contact with said fibrous reinforcement material, the second fibrous reinforcement material and said first and second resin materials together forming a molding; and
   b) at least partially processing the first resin material before locating the molding material in relation to a mold, wherein the step of partially processing comprises at least part curing of the first resin material.

7. A molding material comprising a fibrous reinforcement material, a first resin material and a second resin material, the respective resin materials being in contact with said fibrous reinforcement material, the first resin material being at least partially processed prior to in-mold processing of the molding material.

8. The material of claim 7, wherein the energy input for processing the molding to form the molded article is less than the energy input required for in-mold processing of the molded article from a molding material comprising the same first and second resin material in which the first resin material is unprocessed.

9. The material of claim 7, wherein the dwell stage during processing is shorter than the dwell stage required for manufacturing the molded article from a molding comprising the same first and second resin material in which the first resin material is unprocessed.

10. The material of claim 7, wherein the material has a dwell temperature which is higher than the dwell temperature required for manufacturing the molded article from a molding comprising the same first and second resin material in which the first resin material is unprocessed.

11. The material of claim 7, wherein the fibrous reinforcement material comprises a first layer comprising the first resin material and a second layer comprising the second resin material, the partially processed first layer being in contact with the second layer to form the molding material.

12. The material of claim 7, wherein one or more reinforcement layers are at least partially impregnated with a. resin material.

13. The material of claim 7, wherein the resin material is conjoined to the surface of a fibrous reinforcement layer, whilst the fibrous reinforcement material provides an air path through its structure.

* * * * *